United States Patent [19]

Rakow

[11] 4,358,303

[45] Nov. 9, 1982

[54] ROTATING DEBRIS SCREEN FOR ALTERNATOR

[75] Inventor: Donald G. Rakow, Lombard, Ill.

[73] Assignee: International Harvester Company, Chicago, Ill.

[21] Appl. No.: 71,594

[22] Filed: Aug. 31, 1979

Related U.S. Application Data

[63] Continuation of Ser. No. 876,610, Feb. 10, 1978, abandoned, which is a continuation of Ser. No. 716,485, Aug. 20, 1976, abandoned.

[51] Int. Cl.³ .............................................. B01D 53/24
[52] U.S. Cl. .................................. 55/408; 55/385 R; 310/56; 310/58; 310/88
[58] Field of Search ..................... 310/62, 63, 177, 56, 310/66, 88, 85, 168, 89, 165, 53, 58, 59, 60; 55/400, 408, 385 R

[56] References Cited

U.S. PATENT DOCUMENTS

| | | | |
|---|---|---|---|
| 1,762,028 | 6/1930 | Phelps | 55/408 |
| 1,816,506 | 7/1931 | Wait | 310/56 |
| 2,950,402 | 8/1960 | Glaza | 310/88 |
| 3,041,117 | 6/1962 | Ramsey | 310/88 |
| 3,765,155 | 10/1973 | Courbon | 55/400 |
| 3,855,489 | 12/1974 | Hershberger | 310/85 |
| 4,086,507 | 4/1978 | Roland | 310/88 |

FOREIGN PATENT DOCUMENTS

866517 12/1952 Fed. Rep. of Germany ........ 310/56

*Primary Examiner*—R. Skudy
*Attorney, Agent, or Firm*—F. David Au Buchon

[57] ABSTRACT

An alternator filter arrangement which encorporates an alternator having a driven shaft passing through its housing which has an air intake therein and a non-magnetic filter screen mounted for rotation with the driven shaft with the filter screen being in close proximity to and substantially encompassing the air intake.

2 Claims, 2 Drawing Figures

U.S. Patent  Nov. 9, 1982  4,358,303
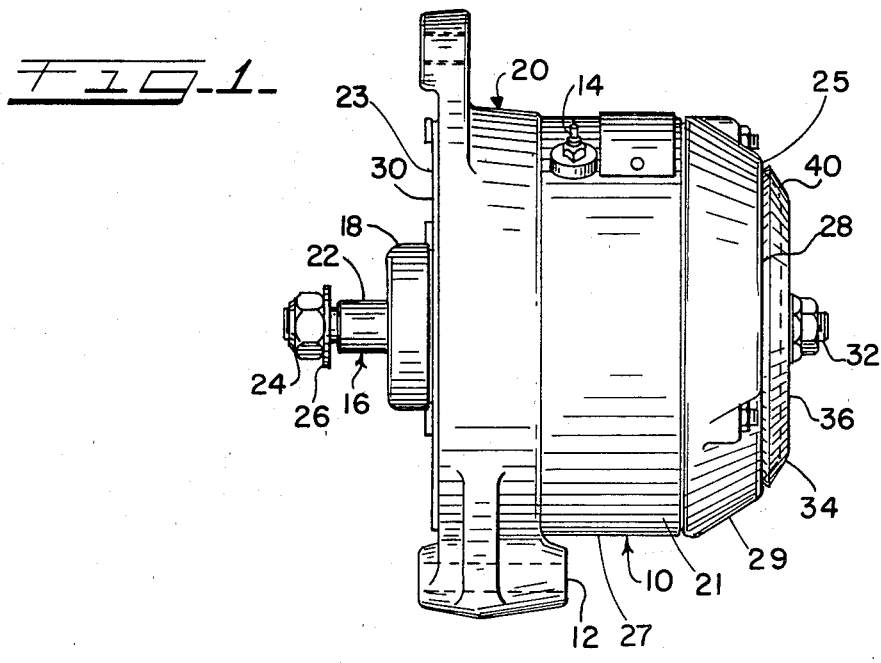
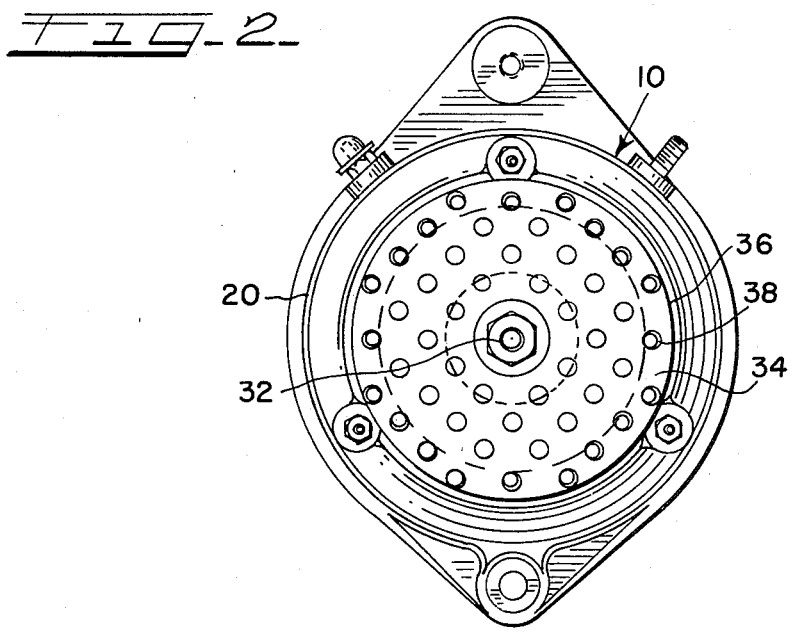

ROTATING DEBRIS SCREEN FOR ALTERNATOR

This is a continuation of application Ser. No. 876,610, filed Feb. 10, 1978, now abandoned which is a continuation of application Ser. No. 716,485 filed on Aug. 20, 1976, now abandoned.

BACKGROUND OF THE INVENTION

This invention relates generally to alternator filters and, more particularly, concerns rotatable alternator filters.

Alternators are used on vehicles to supply electrical energy for vehicles. The field of their use extends from automobiles all the way through rugged off the road construction equipment and farm equipment. Their use in the dirty environments of the off the road and farm equipment vehicles has resulted in a problem in keeping the cooling air passages of the alternators free of dirt and debris. Should these passages become blocked by the foreign matter, the alternator will overheat with the overheating initially decreasing the efficiency and output of the alternator, and ultimately ending in its self-destruction.

In attempting to overcome this overheating problem caused by clogged cooling passages the alternators of the vehicles operatored in such environments, the alternators have previously been equipped with stationary screens designed to prevent the entrance of foreign matter into the alternator cooling passages. Although the stationary screens initially perform their foreign matter filtering function, after the vehicles have been used for a number of hours the screens themselves become clogged with the foreign matter, thereby cutting off all air flow to the alternators cooling passages. This blocking of the filter screen has the same effect as the blocking of the cooling passages, since no cooling air can pass through the alternator, thereby causing it to overheat and eventually fail completely. It is possible to clean the stationary alternators, but in the off the road vehicles the alternators are located at fairly inaccessible positions with the result being the operators fail to remove and clean them at the proper intervals.

Accordingly, it is a primary air of the present invention to provide a rotary filter for an alternator which eliminates the blockage of the alternator's air passages.

Moreover, it is an aim of the present invention to provide such a rotary filter as will operate continuously without requiring periodic cleaning by the vehicle operator.

With more particularity, it is an object of the present invention to provide an operational rotating alternator filter that will not interfere with the flow of electrical current from the alternator.

SUMMARY OF THE INVENTION

An alternator filter arrangement which encorporates an alternator having a driven shaft passing through its housing which has an air intake therein and a non-magnetic filter screen mounted for rotation with the driven shaft with the filter screen being in close proximity to and substantially encompassing the air intake.

BRIEF DESCRIPTION OF THE DRAWING

Other objects and advantages of the invention will become apparent upon reading the following detailed description and upon reference to the drawings, in which:

FIG. 1 is a side view of an alternator incorporating the rotary filter of the present invention.

FIG. 2 is an end view of an alternator incorporating the rotary filter of the present invention.

While the invention will be described in connection with a preferred embodiment, it will be understood that it is not intended to limit the invention to that embodiment. On the contrary, it is intended to cover all alternatives, modifications and equivalents as may be included within the spirit and broad scope of the invention as defined by the appended claims.

DETAILED DESCRIPTION OF THE INVENTION

Turning first to FIG. 1 there is shown an alternator 10 with a conventional plurality of mounting holes 12 and terminals 14 on housing 20. The housing is an enclosure formed by a substantially annular body 21, which includes cylindrical section 27 and conical section 29, connecting substantially planar walls 23 and 25, respectively. The driven shaft 16 of the alternator is shown to pass through wall 23 of the housing 20 and incorporates a dust shield 18 which prevents dust from entering the alternator housing 20.

When mounted on a vehicle the alternator will be driven by a pulley (not shown), or other conventional drive arrangement, which will be mounted on the driven end 22 of the driven shaft 16 and secured thereto by a nut 24 and washer 26. The driven end 22 of shaft 16 can also be used to mount an alternator fan (not shown) which will pull air through the air intake 28 in the wall 25, force it through the alternator housing cooling ducts (not shown) and exit it through a cooling air outlet 30 in the wall 23.

As seen by examination of both FIGS. 1 and 2 the alternator housing 20 is substantially cylindrical in shape which made it possible to utilize the mounting apertures 12 to secure a stationary filter screen around the entire alternator 10. As previously described this alternator screen proved to be ineffective in preventing overheating due to lack of cooling air, since it readily became clogged by the foreign material which it was preventing from entering into the alternator.

In carrying out the invention, the driven shaft 16 is extended through the housing 20 to provide a filter mounting end 32 upon which a filter screen 34 is mounted for rotation with the driven shaft. This arrangement provides a filter which will not become blocked by the debris carried in the cooling air drawn through the alternator. This non-clogging aspect of the filter arrangement of the present invention results from the extremely high speed rotation of the driven shaft 16 and the filter screen 34 during operation of the alternator. The high speed rotation of the filter screen 34 spins off any accumulative debris by centrifugal force.

In the illustrated form the filter screen 34 consists of a disc-like plate 36 containing a plurality of apertures 38 for the passage of air. The disc 36 is spaced apart from the air intake 28 with a circumferential lip 40 angling towards the air intake 28 and towards the wall 25 to insure complete filtering of the cooling air passing through the filter screen 34.

The final characteristic of the filter screen 34 lies in the fact that it must be made of a non-magnetic material. The high speed rotation of screen 34 within the magnetic field of the alternator imposes this material limitation because a magnetic screen revolving at this speed was found to establish a magnetic field through the screen. The screens magnetic field will interfere with the alternator's internal regulator circuit (not shown) by providing a secondary path for the flow of electrical current from the alternator. The net result of this secondary path is a decrease in useable output from the alternator. Therefore, to maintain full operation of the alternator the filter screen of the present invention must be fabricated from a non-magnetic material.

Thus it is apparent that there has been provided, in accordance with the invention, an alternator filter arrangement that filters debris out of the cooling air passing through the alternator without requiring any periodic cleaning of the filtering elements, and without interfering with the operation of the alternator. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a filter arrangement for a high speed alternator of a vehicle, said alternator having an enclosing housing, said housing being formed by a substantially annular body connecting first planer wall having cooling air outlet and second planer wall having cooling air inlet, and having a driven shaft passing through said first planar wall, said shaft having a power receiving end outside said housing, the improvement including, in combination:
    said shaft extending through said housing, exiting said second wall, and having a filter mounting end outside said housing;
    said cooling air inlet being located in said second wall; and
    a non-magnetic self-cleaning filter screen secured on and for rotation with said filter mounting end in the magnetic field of said alternator and in close proximity to and encompassing said air inlet,
    said screen being an apertured disc having a circumferential lip angled toward said second wall.

2. In a filter arrangement for an alternator, said alternator having a cooling air inlet and an enclosing housing formed by a substantially annular body connecting first planer wall having cooling air outlet and second planer wall having cooling air outlet, and having a driven shaft passing through said first and second planar wall the improvement comprising:
    a filter mounting end on said shaft outside said housing;
    a non-magnetic self-cleaning filter screen, being an apertured disc having a circumferential lip angled toward said second wall, secured on and for rotation with said filter mounting end in the magnetic field of said alternator in close proximity to and encompassing said air inlet.

* * * * *